United States Patent [19]

Federspiel

[11] Patent Number: 4,896,789
[45] Date of Patent: Jan. 30, 1990

[54] ANTI-LEAK FUEL CAP LINER

[75] Inventor: Mark E. Federspiel, West Bend, Wis.

[73] Assignee: Tecumseh Products Company, Tecumseh, Mich.

[21] Appl. No.: 312,891

[22] Filed: Feb. 17, 1989

[51] Int. Cl.⁴ ............................................. B65D 51/00
[52] U.S. Cl. .................................. 220/367; 220/203; 220/DIG. 33; 215/260
[58] Field of Search ............... 220/367, 369, 373, 202, 220/203, 205, 209, DIG. 33; 215/260, 307, 311

[56] References Cited

U.S. PATENT DOCUMENTS

| | | |
|---|---|---|
| 1,865,764 | 7/1932 | Keenan . |
| 2,190,827 | 2/1940 | Deeley .................................. 220/44 |
| 2,492,225 | 12/1949 | Kester .................................. 220/44 |
| 3,189,210 | 6/1965 | Heisler ................................. 215/260 |
| 3,310,193 | 3/1967 | Macpherson ..................... 215/311 X |
| 3,406,862 | 10/1968 | Donaldson ............................. 220/44 |
| 3,527,376 | 9/1970 | Young, Jr. ............................. 220/44 |
| 3,557,986 | 2/1969 | Poole, Jr. ........................ 215/260 X |
| 3,684,119 | 8/1972 | Burroughs ....................... 215/260 X |
| 3,733,771 | 5/1973 | Megowen ........................ 215/260 X |
| 4,057,168 | 11/1977 | Bosshold ............................. 220/202 |
| 4,572,395 | 2/1986 | Quitmann ............................ 220/202 |

Primary Examiner—Steven M. Pollard
Attorney, Agent, or Firm—Albert L. Jeffers; John F. Hoffman

[57] ABSTRACT

A vented fuel cap adapted to be removably attached to a filler neck of a fuel tank of the type commonly employed with small internal combustion engines is provided. The vented fuel cap comprises generally a generally cylindrical cap that is formed with inner threads, and is adapted to be threadedly engaged with the filler neck. A liner element is provided to fit within the cap, and is seated along the underside of the top of the cap. The liner element includes an axially inwardly-directed dome-shaped diaphragm portion that includes a slit formed substantially in its center. The cap and liner element allow for bi-directional venting of the fuel tank. The inwardly-directed dome-shaped diaphragm portion of the liner element allows outside air to vent into the fuel tank at a considerably smaller pressure differential than that required to vent outwardly from the interior of the tank.

24 Claims, 1 Drawing Sheet

ANTI-LEAK FUEL CAP LINER

BACKGROUND OF THE INVENTION

The present invention relates to closures for containers, and in particular, to a vented closure or cap arrangement for use with a filler neck of a fuel tank.

Internal combustion engines are typically provided with fuel tanks having a filler neck and a vented cap enclosing an opening at the end of the filler neck. During operation of the internal combustion engine, fuel is consumed in the engine and an additional measured amount of fuel is passed from the fuel tank to the carburetor for later combustion in the engine. Fuel tanks for internal combustion engines, and in particular, small fuel tanks of the type commonly used with gasoline powered lawnmowers, snowblowers, saws, and the like, must contain a venting mechanism to allow fuel to flow from the tank to the carburetor. During operation of the engine, the fuel tank is frequently subject to vibrations, increases in temperature or similar external stimuli which can result in an increase of pressure within the tank. Suitable venting means must be provided to relieve this pressure in order to assure continued smooth operation of the engine. If the tank is not properly vented, the increased pressure within the tank will force the fuel in the tank to seek the area of least resistance in order to lessen this pressure. This area of least resistance will generally be the carburetor, which will ordinarily result in an inefficient performance by the engine and possibly a flooding of the engine. Such an increase in pressure may also occur during non-use of the engine, such as during movement of the lawnmower, etc., or placing the item in an environment that is subject to occasional elevated temperatures.

While it is important to vent the tank, the venting mechanism must be constructed to allow air to enter and leave the tank but must not be so large as to allow fuel to splash out of the tank during movement and particularly during an inversion of the tank, such as may occur during use of a gasoline-powered saw. Similarly, as the level of fuel in the tank decreases due to the consumption of fuel by the internal combustion engine, a venting mechanism must be provided to allow air to enter the tank and occupy the space vacated by the fuel. If the vent does not properly permit the free entrance of air to replace the fuel, a partial vacuum may be created which may inhibit the supply of additional fuel to the engine. In some cases, this partial vacuum may cause a collapse of the walls of the fuel reservoir. Therefore, it is important to provide a venting mechanism that will vent gaseous vapors from within the fuel tank in order to relieve the internal pressure, as well as allow the outside air to vent into the tank to replace the fuel that has passed from the tank to the carburetor. At the same time, the vent must be constructed in a manner that prevents fuel from spilling during movement of the tank, and similarly, prevents external contaminants from entering the tank through the venting area.

Several prior art caps or stoppers that include a venting mechanism have been reported. U.S. Pat. Nos. 1,865,764 and 3,527,376 disclose stoppers and self-venting closures that include a cap having an aperture formed therein, and a slitted diaphragm that is seated in the cap. In each of these caps, the diaphragm acts as a release valve allowing the escape of internal gas pressure through the slit. The patents are directed to venting mechanisms that allow the release of internal pressure, however they do not specifically discuss venting bi-directionally, that is, allowing venting both into and out of the container. U.S. Pat. No. 3,406,862 discloses a venting closure plug for a container that includes a cylindrical diaphragm member having a slit centrally disposed in the resilient material of the end wall of the cylinder. The slit permits pressure within the container to be vented to the atmosphere, while preventing the escape of liquids from the container if the same is tilted or inverted. Similarly, outside air may be vented into the container. By varying the thickness of the side walls of the diaphragm, the closure plug can be constructed to vent into the container at a smaller pressure differential than is required for venting outwardly. The body of the plug includes inner and outer cup-shaped members disposed in telescoping relation to provide an internal cavity in which the diaphragm is positioned. Although this patent provides a mechanism by which the container may be vented both internally and externally, and also provides a mechanism to prevent the escape of liquids from the container when it is tilted, the particular construction of the plug, which requires inner and outer telescoped members as well as the diaphragm member results in a more complex structure of the plug than is desired, which similarly results in an increase in cost.

A fuel cap having a liner with two umbrella valves which permits bi-directional venting has also been used. One of the valves in this liner allows air to enter the fuel tank at a low pressure, and the other valve allows air to exit the container at a higher pressure. With this type of cap, the valves are held in place in the cap with an O-ring gasket and a hard plastic holder. Thus, it is necessary to have four separate pieces fitted within the inner surface of the cap to provide the venting mechanism.

It is desired to provide a vented cap arrangement to be used with a container such as a fuel tank, that is capable of venting vapors from within the container to the atmosphere, and likewise allowing the entrance of outside air to replace the fuel that has been drained from the tank. It is desired that venting of air into the tank occur at a lower pressure differential than venting of vapors from within the tank. It is also desired to provide a cap that will prevent the fuel or other liquid from splashing from the tank during movement, or to leak from the tank during tilting or inverting of the tank. Additionally, it is desired to provide such a closure that is simple in construction, has few parts, and is economical to manufacture.

SUMMARY OF THE INVENTION

Accordingly, a vented cap for a fuel reservoir or tank is provided. The cap has an outer body that includes an aperture extending through the top of the body. A liner element that includes a dome-shaped diaphragm member is seated within the cap. The diaphragm member has a slit formed therein which permits the venting of air and gaseous vapors both into and out of the reservoir.

The invention solves the problems of the prior art by providing a vented cap for a fuel reservoir that provides means for allowing outside air to pass into a reservoir, and similarly allows gaseous vapors and pressure within the fuel reservoir to vent to the outside atmosphere when the pressure exceeds a predetermined amount. The cap and liner assembly includes only two parts, and is much more economical to manufacture than prior art vented caps, that typically contain three, four or even more parts in order to accomplish the effects obtainable by the cap of the present invention.

The fuel cap and liner assembly in one form of the present invention includes an outer cap having an aperture in the top portion of said cap, and a flexible liner element seated within the cap. The liner element includes an outer gasket portion and an inner diaphragm portion. The gasket portion is substantially annular, is positioned contiguous to the underside of the top of the cap, and extends substantially along the periphery of the underside of the cap. This gasket portion forms an effective seal when the cap is affixed to a filler neck, and inhibits the leakage of fluids from the reservoir when the fuel tank is moved or inverted. The diaphragm portion extends generally axially inwardly from the gasket portion, and is substantially dome-shaped. A transverse slit is formed substantially in the center of the dome. In its normal vented position, the slit is slightly open and permits outside air to enter the reservoir through the aperture in the cap and through the slit. If the pressure within the reservoir increases, the dome portion is pushed upwardly away from the pressure, and the slit is closed. If a severe build-up of pressure occurs in the reservoir, this pressure may force the dome further upwardly away from the fuel, and result in a temporary collapse of the dome. This collapse causes the slit to open and allows the escape of the gaseous vapors that caused the increase in pressure. Because of the dome-shaped construction of the diaphragm, a greater pressure differential is required to collapse the diaphragm to cause venting to the atmosphere than is required to vent internally.

The shape of the dome can be varied, as well as the thickness of the materials used to construct the liner element. By varying these elements in this manner, the particular pressure at which the dome closes, and ultimately collapses can be adjusted according to the specific pressure at which it is desired to have these events occur.

An advantage of the above invention is that it provides a vented fuel cap that may be assembled from only two working parts, i.e., the cap and the liner. Another advantage of this invention is that it provides a vented fuel cap that may be produced at a low cost.

Yet anothr advantage of this invention is that it provides a fuel cap that includes a slit that is closed upon the buildup of pressure within a reservoir, and allows the fuel reservoir to be moved and even inverted without a spillage or leakage of fuel.

A further advantage of this invention is that it provides a vented cap for a reservoir having a liner that may be constructed according to predetermined specifications based on the specific pressure at which it is desired to cause the dome to collapse.

The present invention, in one form thereof, provides a vented cap assembly for a fuel reservoir of the type having a filler neck and a fuel-receiving opening in the neck. The cap assembly comprises a cap member that includes means for removably attaching the cap member to the filler neck of the fuel tank. In addition, the cap assembly further includes a liner element engaging an underside of the cap member and adapted to be disposed in the fuel-receiving opening when the cap assembly is attached to the filler neck. The liner element includes a flexible generally dome-shaped diaphragm portion having a convex surface facing axially away from the underside of the cap member and a concave surface facing the underside of the cap member. The dome-shaped diaphragm portion is spaced away from the gasket portion by a cylindrical wall a sufficient distance to isolate the dome portion from the gasket portion, which may experience twisting forces as the gas cap is screwed in place. The dome-shaped portion further has a slit extending therethrough from the convex surface to the concave surface. In addition, means associated with the cap member for venting gases to and from the underside of the cap member is provided, such as an aperture formed in the top portion of the cap member.

DETAILED DESCRIPTION OF THE PREFERRED EMBODIMENT

Figure 1:
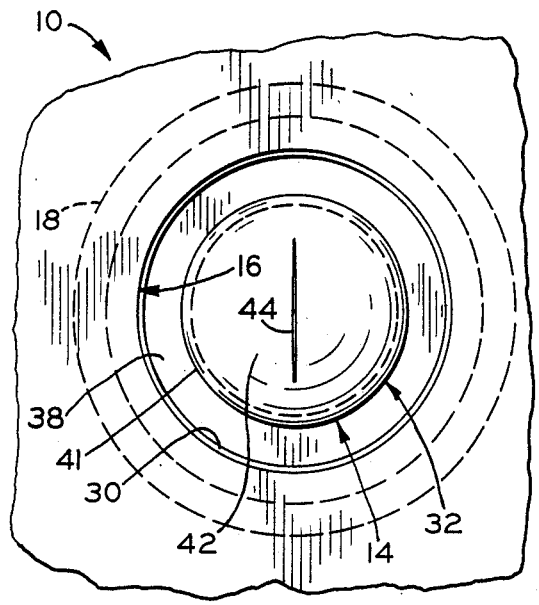
FIG. 1 is a bottom view of a fuel cap and liner according to the present invention, with the cap being engaged to the filler neck of a fuel tank.
Figure 2:
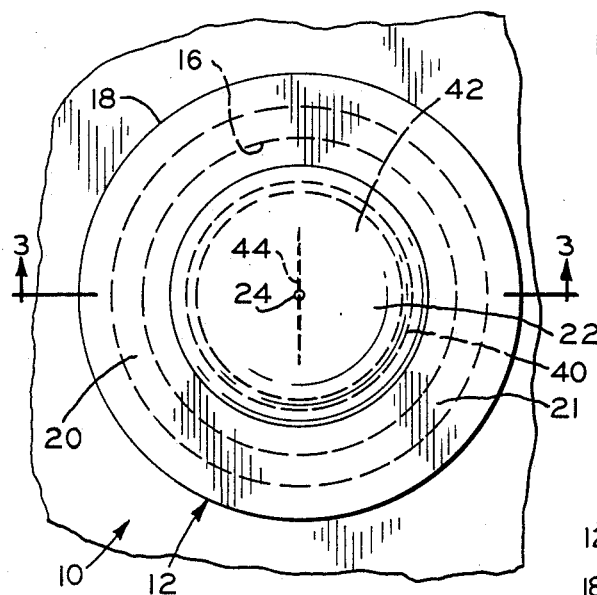
FIG. 2 is a top, plan view of the fuel cap and liner of FIG. 1.
Figure 3:
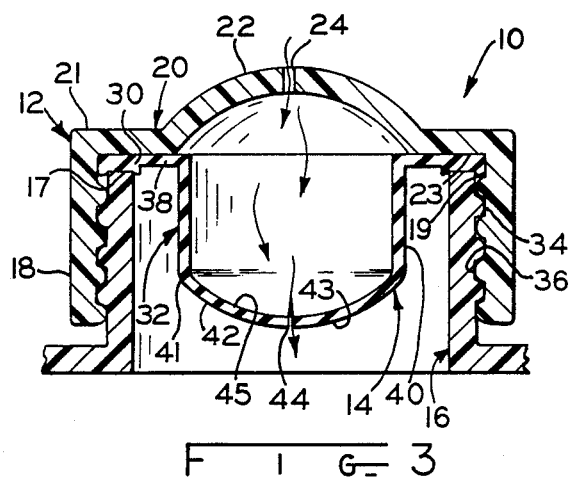
FIG. 3 is a sectional view taken along line 3—3 of FIG. 2, showing the cap and liner of the present invention engaged with a filler neck of a fuel tank, and further showing the liner in a normal venting position with the arrows designating air entering the tank through an aperture in the cap and an opening in the slit of the liner.
Figure 4:
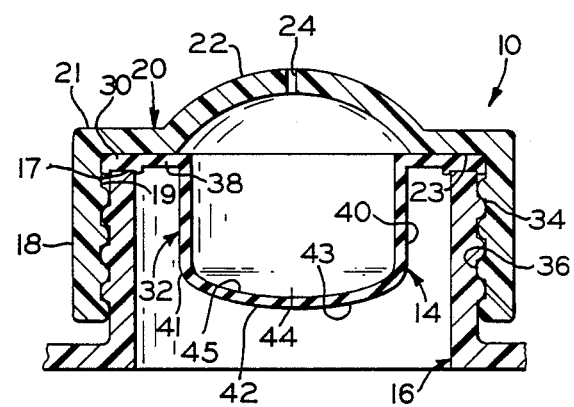
FIG. 4 is a sectional view similar to FIG. 3, showing the cap and liner in a slightly pressurized condition, wherein the slit in the liner is closed.
Figure 5:
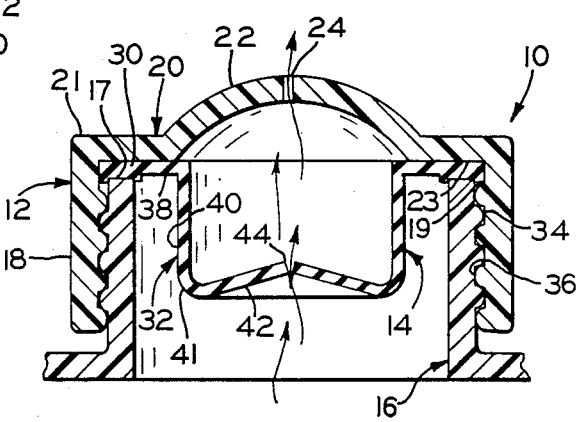
FIG. 5 is another sectional view similar to FIG. 3, wherein the tank is under a pressurized condition forcing the liner upwardly which creates an opening in the slit to allow vapors within the gas tank to vent outwardly.

Referring now to the drawings, fuel cap and liner assembly 10 according to the present invention comprising fuel cap 12 and liner 14 as shown in FIGS. 3–5 are threadedly engaged with an end of a conventional filler neck 16 of a fuel tank for a small engine (not shown). Fuel cap 12 as shown in the drawings has a generally cylindrical side body 18 having a cylindrical inner surface 19. A circular top 20 is provided, which has a generally flat outer portion 21 and a somewhat dome-shaped inner portion 22. An aperture 24 is formed substantially in the center of radially inner portion 22. While the embodiment shown in the drawings illustrates a cap having a substantially cylindrical outer body, it will be appreciated that other outer body shapes such as rectangular, hexagonal, etc., may be substituted without varying from the scope of the invention. Similarly, the particular shape of the top 20 as illustrated in the drawings may vary from the embodiment shown, such as to a completely flat top or wall portion 20 without departing from the scope of the invention, the embodiment shown being merely that preferred by the inventor. Vent hole 24 could be located elsewhere or venting of cap 12 could be accomplished by other means.

A flexible, resilient liner 14 is positioned inside cap 12 and is seated contiguous to underside 23 of outer portion 21 of top 20. Liner 14 includes an outer, generally annular gasket portion 30 and an inner diaphragm portion 32. Outer gasket portion 30 has an outer diameter substantially equal to the diameter of cylindrical inner surface 19 of cap side body 18, and is located between upper edge 17 of filler neck 16, and underside 23 of cap top portion 20 as shown in FIGS. 3-5. In this position, outer gasket portion 30 provides a reliable seal between filler neck 16 and cap 12, and inhibits the leakage of fluids from the container. In the embodiment shown, filler neck 16 has threads 34 that engage mating threads 36 formed on cylindrical inner surface 19 of cap side body 18. Cap 12 is screwed onto filler neck 16 in the conventional manner, although other closing means may be substituted without departing from the scope of the invention. As cap 12 is screwed onto neck 16, upper edge 17 of neck 16 engages outer gasket portion 30 of liner 14. Gasket portion 30 is flexible and resilient, which allows cap 12 to be screwed onto neck 16 until gasket 30 is slightly compressed.

A diaphragm portion 32 of liner 14 adjoins gasket portion 30. Diaphragm portion 32, in the embodiment shown, includes a connecting portion 38, a sidewall portion 40 and a dome-shaped diaphragm 42 having its convex surface 43 facing away from the underside of cap 12. Concave surface 45 faces cap underside 23. Connecting portion 38 in the embodiment shown is of somewhat lesser thickness than gasket portion 30. Connecting portion 38 is positioned adjacent the inner periphery of gasket portion 30 and is seated contiguous to underside 23 of top 20. Sidewall portion 40 extends axially inwardly in a generally perpendicular direction from connecting portion 38 and top portion 20 of cap 12. Sidewall portion 40 is generally cylindrical, and extends axially a predetermined distance to end 41 and is integral with dome 42 as shown in FIGS. 3-5. A transverse slit 44 is formed in dome 42. For best results, slit 44 is generally formed at the center of dome 42, which, in the embodiment shown, is the distal portion at the center of dome 42. Sidewall portion 30 serves to space away the dome-shaped diaphragm portion 42 from gasket portion 30 so as to isolate any twisting forces from dome 42. If dome 42 is located too close to gasket portion 30, as cap 12 is screwed in place, the twisting forces exerted thereon will be transferred to the dome portion, thereby permanently opening slit 44. Cylindrical portion 40 only need to sufficiently long to provide the desire isolation of dome portion 42 from gasket portion 30. For example, cylindrical portion 32 could have a length of about 0.4 inches.

When cap 12 is positioned on filler neck 16, dome 42 and slit 44 are affected by changes in the pressure within the fuel tank. FIG. 3 shows a normal venting condition wherein outside air enters the tank through aperture 24 and slit 44. Ordinarily, this condition occurs during normal operation of the internal combustion engine wherein fuel is continually being drawn from the tank to the carburetor (not shown). Outside air enters the tank through aperture 24 and slit 44 to replace the space occupied by the fuel that has passed from the tank to the carburetor. Dome 42 is relatively intact during this condition as shown in FIG. 3. As pressure builds in the tank as a result of vibration of the fuel tank, elevation of temperature, movement of the machine to which the tank is attached, etc., dome 42 is slightly compressed and slit 44 is closed as shown in FIG. 4. In this condition, the closing of slit 44 prevents fluid from being forced out of the tank, and also prevents fuel from spilling out of the tank during tilting or inverting of the tank. If the pressure build-up becomes excessive, dome 42 collapses in response to this pressure as shown in FIG. 5, and the air and vapors in the tank escape to the atmosphere through slit 44 and aperture 24. If dome 42 were not capable of collapse as shown, a build-up of pressure would force the fuel down the carburetor and inhibit the efficiency of the engine, and possibly even flood the engine. By constructing diaphragm element 32 in the shape of an inwardly-directed, slitted dome as shown in FIGS. 3-5, a mechanism is provided which allows air to enter the tank at a considerably smaller pressure diferential than that required to vent outwardly from the interior of the tank.

Cap 12 is generally formed from a thermoplastic material, although other conventional materials such as steel may be substituted. Liner 14 is generally formed of a flexible, resilient elastomeric material such as rubber, however, other suitable materials may also be substituted. The exact shape and curvature of the elements forming the diaphragm, and in particular the shape of the dome, may be varied according to the specific amount of pressure desired to cause collapse of the dome. Similarly, the thickness of any of these elements may be varied to enhance, or alternatively to inhibit, the ability of the dome to collapse in response to internal pressure.

The fuel cap and liner assembly of the present invention and many of its attendant advantages will be understood from the foregoing description, and it will be apparent that various changes may be made in the form, construction and arrangement of the parts thereof without departing from the spirit and scope of the invention or sacrificing all of its material advantages, the form hereinbefore described being merely a preferred embodiment thereof.

What is claimed is:

1. A vented cap assembly for a fuel reservoir of the type having a filler neck and a fuel-receiving opening in the neck, said cap assembly comprising:
   a cap member including means for removably attaching the cap member to the filler neck of a fuel tank;
   a liner element engaging an underside of said cap member and adapted to be disposed in the fuel-receiving opening when said cap assembly is attached to a filler neck, said liner element including a flexible generally dome-shaped diaphragm portion having a convex surface facing axially away from said underside of said cap member and a concave surface facing said underside of said cap member, said dome-shaped portion having a slit extending therethrough from the convex surface to the concave surface; and
   means associated with said cap member for venting gases to and from the underside of said cap member.

2. The cap assembly as described in claim 1, wherein said liner element further includes a gasket portion disposed radially outwardly from said diaphragm portion, said gasket portion being in engagement with the underside of said cap member.

3. The cap assembly as described in claim 2, wherein said diaphragm portion of said liner element further comprises an annular connecting portion lying adjacent said gasket portion and engaging the underside of said cap member, a generally cylindrical sidewall portion extending axially inwardlyin a generally perpendicular direction from said connecting portion, and a dome integral with said sidewall portion, said dome further having said slit extending therethrough.

4. The cap assembly as described in claim 3, wherein said slit is generally centrally disposed in said dome.

5. The cap assembly as described in claim 1, wherein the liner element is made of a flexible, resilient material.

6. The cap assembly as described in claim 1, wherein the liner element is rubber.

7. The cap assembly as described in claim 1, wherein said means for removably attaching the cap member to the filler neck of the fuel tank comprises screw threads formed on an internal surface of said cap means and being adapted to engage mating screw threads formed on an external surface of the filler neck.

8. The cap assembly as described in claim 1, wherein the cap is made of a thermoplastic material.

9. The cap assembly as described in claim 1, wherein the cap is made of steel.

10. The cap assembly as described in claim 1, wherein said means associated with said cap member for venting gases to and from the underside of said cap member comprises an aperture formed in said cap member and extending therethrough.

11. The cap assembly as described in claim 10, wherein said aperture is disposed substantially in the center of the top of said cap member.

12. A vented cap assembly for a fuel tank of the type having a filler neck and a fuel-receiving opening in the neck, said cap assembly comprising:
a cap member including means for removably attaching the cap member to the filler neck of a fuel tank;
a liner element having a radially outer gasket portion and a radially inner flexible diaphragm portion, said radially outer gasket portion engaging with an underside of said cap member, said radially inner diaphragm portion being adapted to be disposed in the fuel-receiving opening when said cap assembly is attached to a filler neck, said diaphragm portion further being generally dome-shaped and having a convex surface facing axially away from said underside of said cap member and a concave surface facing said underside of said cap member, said dome-shaped portion having a slit extending therethrough from the convex surface to the concave surface; and
means associated with said cap member for venting gases to and from the underside of said cap member.

13. The cap assembly as described in claim 12 wherein said diaphragm portion of said liner element further comprises an annular connecting portion lying adjacent said gasket portion and engaging the underside of said cap member, a generally cylindrical sidewall portion extending axially inwardly in a generally perpendicular direction from said connecting portion, and a dome integral with said sidewall portion, said dome further having said slit extending therethrough, said cylindrical sidewall portion being sufficiently long to isolate said dome from twisting forces exerted on said annular connecting portion when said cap member is attached.

14. The cap assembly as described in claim 13, wherein said slit is generally centrally disposed in said dome.

15. The cap assembly as described in claim 12, wherein said means for removably attaching the cap member to the filler neck of the fuel tank comprises screw threads formed on an internal surface of said cap means and being adapted to engage mating screw threads formed on an external surface of the filler neck.

16. The cap assembly as described in claim 12, wherein the liner element is rubber.

17. The cap assembly as described in claim 12, wherein said means associated with said cap member for venting gases to and from the underside of said cap member comprises an aperture formed in said cap member and extending therethrough.

18. The cap assembly as described in claim 17, wherein said aperture is disposed substantially in the center of the top of said cap member.

19. In combination with a fuel tank of the type having a filler neck and a fuel-receiving opening in the neck, a vented cap assembly comprising:
a cap member including means for removably attaching the cap member to the filler neck of a fuel tank;
a liner element engaging an underside of said cap member and adapted to be disposed in the fuel-receiving opening when said cap assembly is attached to a filler neck, said liner element including a flexible generally dome-shaped diaphragm portion having a convex surface facing axially away from said underside of said cap member and a concave surface facing said underside of said cap member, said dome-shaped portion having a slit extending therethrough from the convex surface to the concave surface; and
means associated with said cap member for venting gases to and from the underside of said cap member.

20. The combination of claim 19, wherein said liner element further includes a gasket portion disposed radially outwardly from said diaphragm portion, said gasket portion being in engagement with the underside of said cap member.

21. The combination of claim 20, wherein said diaphragm portion of said liner element further comprises an annular connecting portion lying adjacent said gasket portion and engaging the underside of said cap member, a generally cylindrical sidewall portion extending axially inwardly in a generally perpendicular direction from said connecting portion, and a dome integral with said sidewall portion, said dome further having said slit extending therethrough.

22. The combination of claim 21, wherein said slit is generally centrally disposed in said dome.

23. The combination of claim 19, wherein said means for removably attaching the cap member to the filler neck of the fuel tank comprises screw threads formed on an internal surface of said cap means and engaged with mating screw threads formed on an external surface of the filler neck.

24. The combination of claim 19, wherein said means associated with said cap member for venting gases to and from the underside of said cap member comprises an aperture formed in said cap member and extending therethrough.

* * * * *